(12) United States Patent
Weitkus et al.

(10) Patent No.: US 10,688,996 B2
(45) Date of Patent: Jun. 23, 2020

(54) METHOD TO OPERATE A VEHICLE CONGESTION ASSISTANT

(71) Applicant: Ford Global Technologies, LLC, Dearborn, MI (US)

(72) Inventors: Guido Weitkus, Cologne NRW (DE); Andreas Meyer, Kuerten NRW (DE); Manuel Merz, Montabaur RLP (DE); Benjamin Maus, Duesseldorf (DE); Mohamed Benmimoun, Aachen NRW (DE); Fabian Kuzaj, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/977,684

(22) Filed: May 11, 2018

(65) Prior Publication Data
US 2018/0334168 A1    Nov. 22, 2018

(30) Foreign Application Priority Data
May 18, 2017  (DE) .......................... 10 2017 208 384

(51) Int. Cl.
*B60W 30/12* (2020.01)
*B60W 30/17* (2020.01)
(Continued)

(52) U.S. Cl.
CPC ...... *B60W 30/18018* (2013.01); *B60W 30/12* (2013.01); *B60W 30/17* (2013.01);
(Continued)

(58) Field of Classification Search
CPC ................. B60W 30/12; B60W 30/17; B60W 30/18018; B60W 30/182; B60W 50/0098;
(Continued)

(56) References Cited

U.S. PATENT DOCUMENTS

2008/0170754 A1\* 7/2008 Kawasaki .......... G06K 9/00805
382/104
2013/0172771 A1 7/2013 Muhlsteff
(Continued)

FOREIGN PATENT DOCUMENTS

| DE | 102004019896 A1 | 11/2004 |
| DE | 102010049086 A1 | 4/2012 |
| DE | 102011083039 A1 | 3/2013 |

OTHER PUBLICATIONS

Chaitra Vijaygopalra Urs, B.E., "A Vehicle—Collision Learning System Using Driving Patterns on the Road," A Thesis Prepared for the Degree of Master of Science, University of North Texas, Aug. 2013, pp. 1-96.
(Continued)

*Primary Examiner* — Anshul Sood
(74) *Attorney, Agent, or Firm* — Brooks Kushman P.C.; Frank MacKenzie

(57) ABSTRACT

The disclosure relates to a method and system to operate a motor vehicle with a congestion assistant. The congestion assistant enters sensor data, which serves as input data of the congestion assistant. The sensor data is evaluated, via an evaluation unit, in order to define a value representing a signal roughness of the sensor data. The value is compared, via a comparison unit, with a threshold value. A suppression signal is generated, via a signal detection unit, to prevent automatic activation of the congestion assistant if the value is greater than the threshold value.

19 Claims, 4 Drawing Sheets

(51) Int. Cl.
  *B60W 30/18* (2012.01)
  *G06K 9/00* (2006.01)
  *B60W 30/182* (2020.01)
  *B60W 50/00* (2006.01)
(52) U.S. Cl.
  CPC ...... *B60W 30/182* (2013.01); *B60W 50/0098* (2013.01); *G06K 9/0051* (2013.01); *G06K 9/00791* (2013.01); *G06K 9/0053* (2013.01)
(58) Field of Classification Search
  CPC ... B60W 50/02; G06K 9/0051; G06K 9/0053; G06K 9/00791
  See application file for complete search history.

(56) References Cited

U.S. PATENT DOCUMENTS

| | | | | |
|---|---|---|---|---|
| 2014/0032108 A1* | 1/2014 | Zeng | ................. | B60W 30/12 701/533 |
| 2014/0218508 A1* | 8/2014 | Kim | ................. | B62D 15/025 348/118 |
| 2015/0344027 A1* | 12/2015 | Oooka | ................. | B60W 30/00 701/408 |
| 2016/0201277 A1* | 7/2016 | Svantesson | ............ | E01C 23/01 73/146 |
| 2017/0029021 A1* | 2/2017 | Lee | ................. | B62D 5/0457 |
| 2018/0065633 A1* | 3/2018 | Tamura | ............... | B60W 30/165 |
| 2019/0041495 A1* | 2/2019 | Steinbuch | ................. | G01S 7/35 |

OTHER PUBLICATIONS

Staffan Bengtsson, "Detection and Prediction of Lane-Changes: A Study to Infer Driver Intent Using Support Vector Machine," KTH Industrial Engineering and Management, Master of Sciences Thesis, Stockholm, Sweden, 2012, pp. 1-75.

Brendan Morris, et. at., "Lane Change Intent Prediction for Driver Assistance: On-Road Design and Evaluation," 2011 IEEE Intelligent Vehicles Symposium (IV), Baden-Baden, Germany, Jun. 5-9, 2011, pp. 895-901.

* cited by examiner

METHOD TO OPERATE A VEHICLE CONGESTION ASSISTANT

CROSS-REFERENCE TO RELATED APPLICATIONS

This application claims foreign priority benefits under 35 U.S.C. § 119(a)-(d) to DE Application 10 2017 208 384.0 filed May 18, 2017, which is hereby incorporated by reference in its entirety.

TECHNICAL FIELD

The disclosure relates to a method to operate a motor vehicle with a congestion assistant, as well as a congestion assistant and controller therefor.

BACKGROUND

A congestion assistant is a driver assistance system based on an information fusion of an adaptive cruise control and a lane centering assist. The congestion assistant is configured to accelerate, brake and steer a motor vehicle autonomously, i.e. in an automated manner.

An adaptive cruise control ("ACC") or adaptive speed control or automatic distance control ("ADC") is understood to mean a speed control system in motor vehicles that, in controlling the speed, incorporates a distance to a motor vehicle driving in front as an additional feedback and correcting variable.

The adaptive cruise control may form part of a radar-supported emergency braking assistant. Adaptive cruise controls of this type enable an automated full braking to the point of stopping (e.g. in stop-and-go traffic). With a stop-and-go function, autonomous starting after briefly stopping or driver-triggered restarting is possible, e.g. following driver confirmation by tapping on the accelerator pedal or actuating the control lever, up to the speed predefined by the driver. This function serves to provide extra comfort for the driver in urban traffic and in tailbacks on motorways.

The lane centering assist ("LCA") is configured to stop the motor vehicle automatically in a center of a lane on a road. The lane centering assist can use e.g. data of a radar system and/or a camera, such as a stereo camera. An orientation takes place based on e.g. lateral boundary lines of the lane and, where relevant, additionally based on a vehicle driving in front. A lane departure warning system can furthermore be configured to avoid an unintentional departure from the lane and collisions with objects to a side of the vehicle through active steering interventions.

The camera of the lane departure warning system is used during operation for the orientation. The congestion assistant thus obtains information on a road layout using road markings and a direction of the vehicle ahead. The congestion assistant can also decide whether the road or the vehicle ahead should be followed. The motor vehicle is thereby prevented from following a motor vehicle that is turning off or changing lanes. A distance to the vehicle ahead is continuously controlled by the adaptive cruise control.

The congestion assistant becomes active automatically when the driver has switched the congestion assistant to standby and general external conditions allow its activation.

However, unwanted deactivations of the congestion assistant may occur if, for example, due to unfavorable weather conditions, a side line and/or center line detection is not possible, a quality of the road markings is poor, or the motor vehicle is located in an area of roadworks. This may confuse and irritate the driver.

SUMMARY

The object of the disclosure is therefore to increase the reliability of a congestion assistant of this type.

According to the disclosure, the following steps are carried out in a method to operate a motor vehicle with a congestion assistant:

entering sensor data serving as input data of the congestion assistant, evaluating the sensor data in order to define a value representing a signal roughness of the sensor data, comparing the value with a threshold value, and generating a suppression signal to prevent automatic activation of the congestion assistant if the value is greater than the threshold value.

The disclosure is based on a surprising realization that unreliable road marking detection—in areas of roadworks and/or due to noisy sensor signals—results in an increased signal roughness due to unsteady sensor signal characteristics. This signal roughness is recorded as a measure of a signal instability and, if it exceeds a threshold value, a suppression signal is generated that prevents a further activation of the congestion assistant. It is thus ensured that the congestion assistant is active only if reliable sensor data are present that allow a reliable operation of the congestion assistant.

According to one embodiment, the sensor data are evaluated in order to define signal jumps that define the value representing the signal roughness. It is thus determined whether abrupt signal level changes are present in the sensor data. A predefined criterion can be used, which defines when an abrupt signal level change is present, e.g. if a value change exceeds a predefined percentage value change within a predefined time interval. A value representing the signal roughness can thus be particularly simply defined.

According to a further embodiment, the sensor data relate to data for a deviation of a motor vehicle center from a center line of a road. Where the motor vehicle is located in relation to a center line on a road is thus taken into account.

According to a further embodiment, the sensor data relate to data for an alignment of the motor vehicle with a center line of a road. A direction of travel of the motor vehicle is thus taken into account.

According to a further embodiment, the sensor data relate to a curve of a road. A layout of a road is thus taken into account, e.g. whether a right or left bend is present.

According to a further embodiment, the sensor data are data indicative of a reliability of a side line detection and/or center line detection. This may involve a right and/or left side line. A polynomial describing respective road markings can be evaluated in order to define a value indicative of reliability.

The disclosure furthermore relates to a computer program product to carry out the method, such as for example a control device or controller, and also a congestion assistant of this type and a motor vehicle with a congestion assistant of this type.

Further features, characteristics and advantages of the disclosure are set out in the following description of example embodiments, with reference to the attached drawings.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
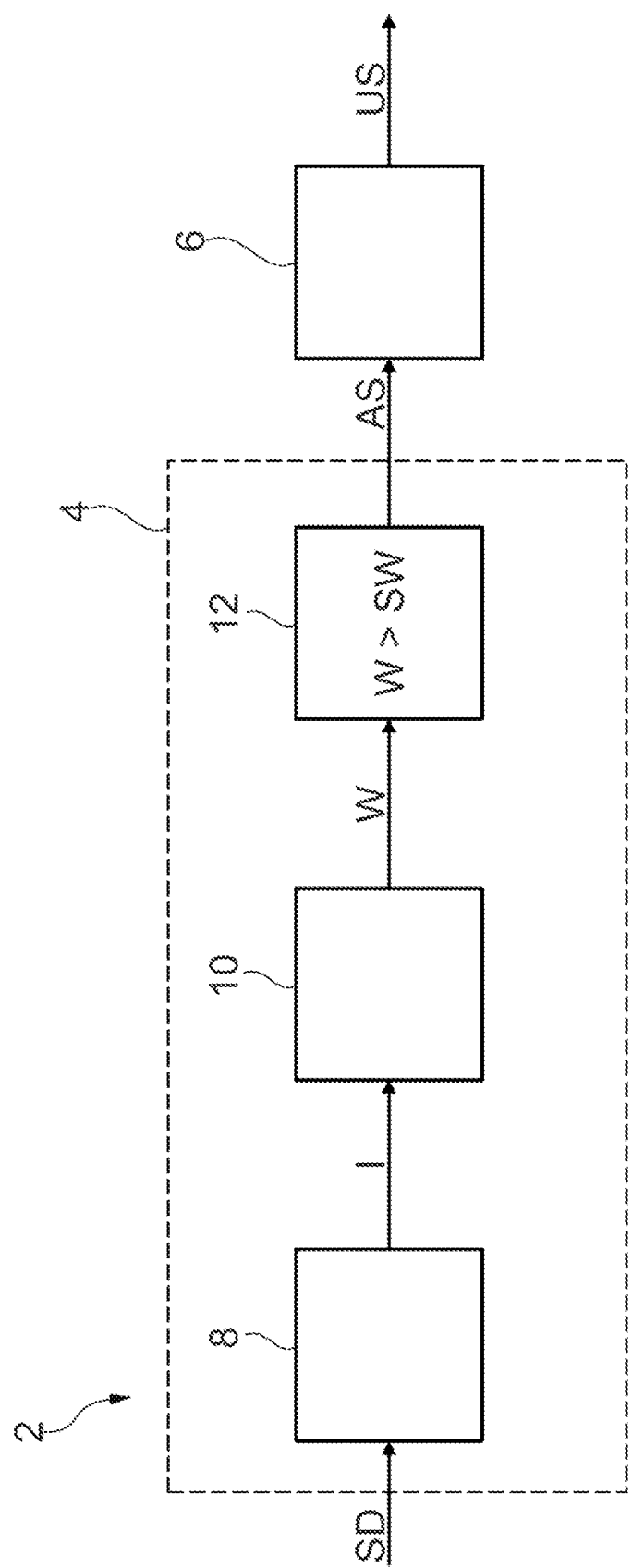
FIG. 1 shows a schematic representation of an example embodiment of a lane centering assist for a motor vehicle.

Reference is first made to FIG. 1.

Components of a congestion assistant 2 of a motor vehicle (not shown), such as e.g. a passenger vehicle, are shown.

The congestion assistant 2 is configured to accelerate, brake and steer the motor vehicle autonomously, i.e. in an automated manner.

To do this, the congestion assistant 2 uses components and functions of an adaptive cruise control (not shown) and a lane centering assist (not shown) of the motor vehicle.

The adaptive cruise control is a speed control system that incorporates a distance to a motor vehicle driving in front as an additional feedback and correcting variable when controlling a speed of the motor vehicle.

The lane centering assist is configured to keep the motor vehicle automatically in a center of a lane of a road (not shown).

A camera, such as a mono or stereo camera, is assigned to the lane centering assist. A road layout of the lane, right-side and left-side road markings and center lines of the road can be detected through evaluation of image data provided by the camera. A LIDAR ("Light Detection And Ranging") system can also be used instead of a camera.

A driver (not shown) of the motor vehicle can switch the congestion assistant 2 to standby. If prerequisites for a takeover of motor vehicle control by the congestion assistant 2 are met, the congestion assistant 2 becomes active and accelerates, brakes and steers the motor vehicle 2 autonomously.

However, unwanted deactivations of the congestion assistant 2 may occur if, for example, due to unfavorable weather conditions, a side line or center line detection is not possible, a quality of the road markings is poor, or the motor vehicle is located in an area of roadworks.

In order to increase reliability of the congestion assistant 2, the latter has an evaluation unit 4 and a signal generation unit 6.

The evaluation unit 4 is configured to input image data in the form of sensor data SD and to evaluate the sensor data SD in order to define a value W representing a signal roughness of the sensor data SD. The sensor data SD are input sensor data to operate the congestion assistant 2. In the present example embodiment, the sensor data SD have data relating to a deviation of a motor vehicle center from a center line of a road, an alignment of the vehicle with a center line of a road and a curve of a road. The sensor data SD furthermore have data that are indicative of a reliability of a site line and/or center line detection.

In order to define the value W, the congestion assistant 2 is configured to evaluate the sensor data SD in order to define signal jumps. To do this, in the present example embodiment, the evaluation unit 4 has a jump detection unit 8, a value determination unit 10 and a comparison unit 12, the function of which will be explained in detail below.

The congestion assistant 2, the evaluation unit 4, the signal detection unit 6, the jump detection unit 8, the value determination unit 10 and/or the comparison unit 12 have hardware and/or software components for these functions, such as for example a microprocessor.

Figure 2:
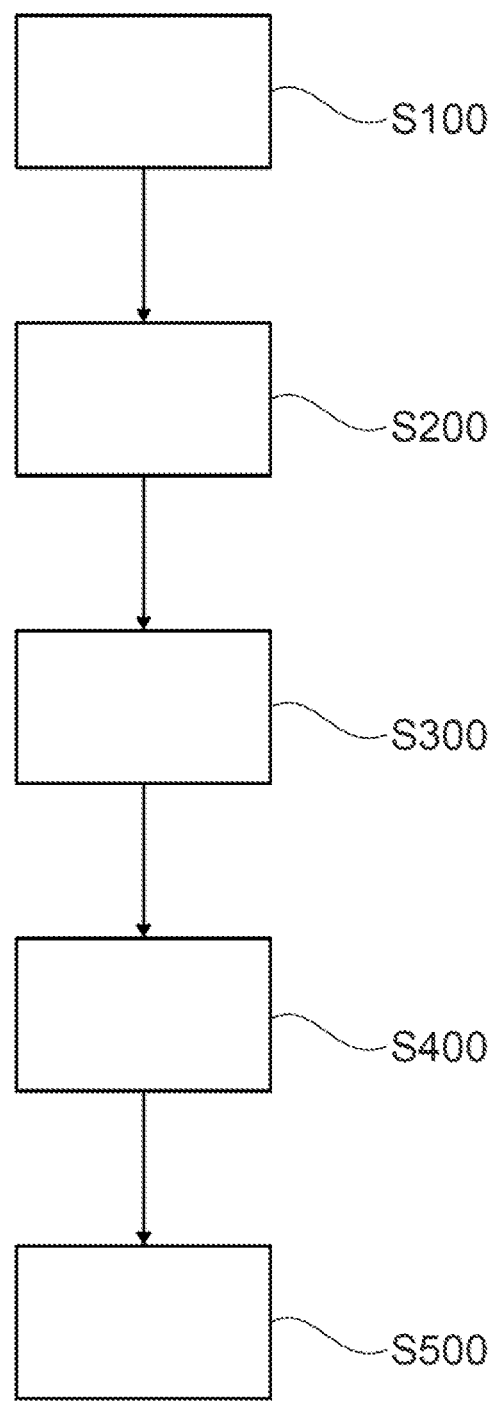
FIG. 2 shows a method sequence in operation of the lane centering assist shown in FIG. 1.
Figure 3:
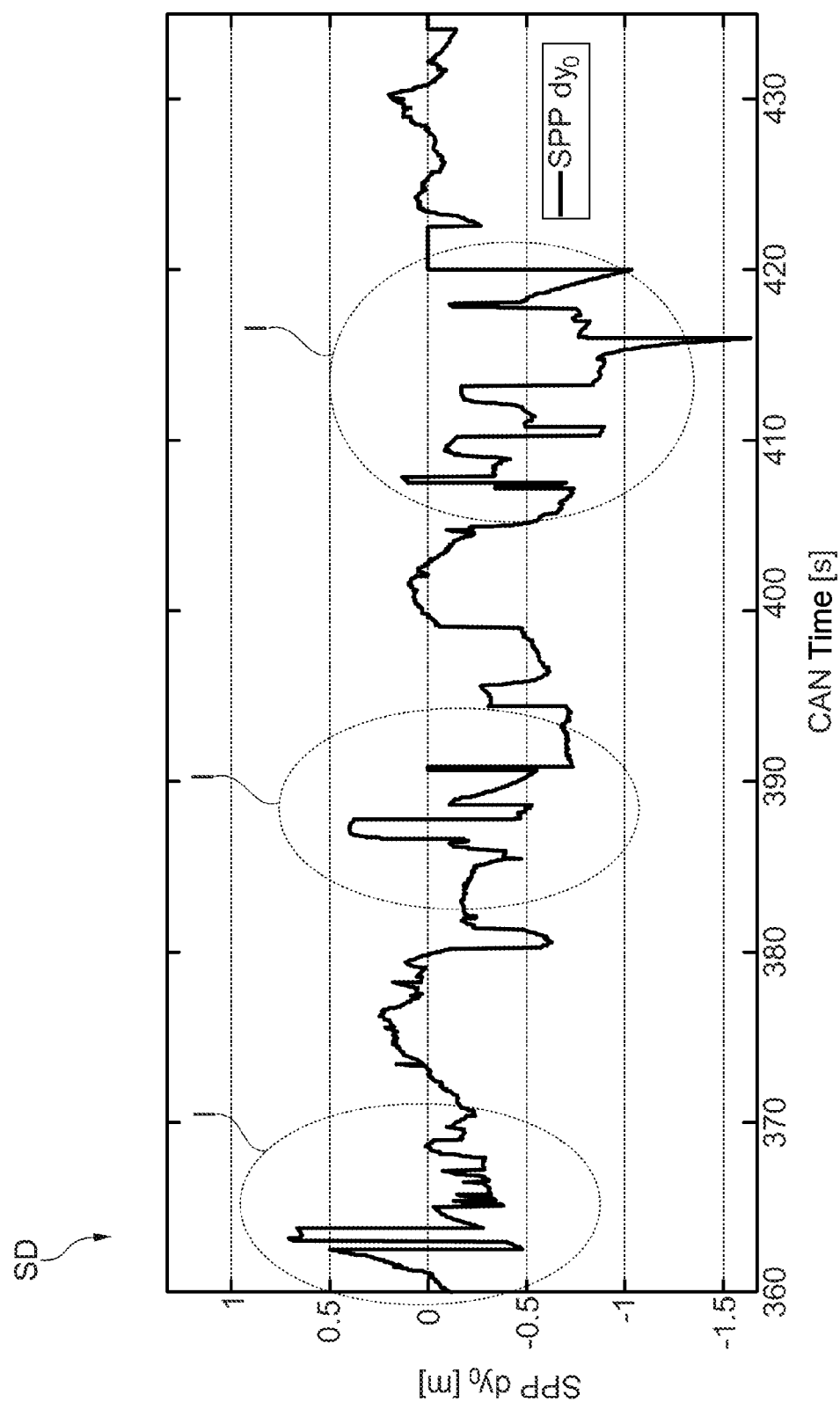
FIG. 3 shows a schematic representation of a signal characteristic with signal jumps.
Figure 4:
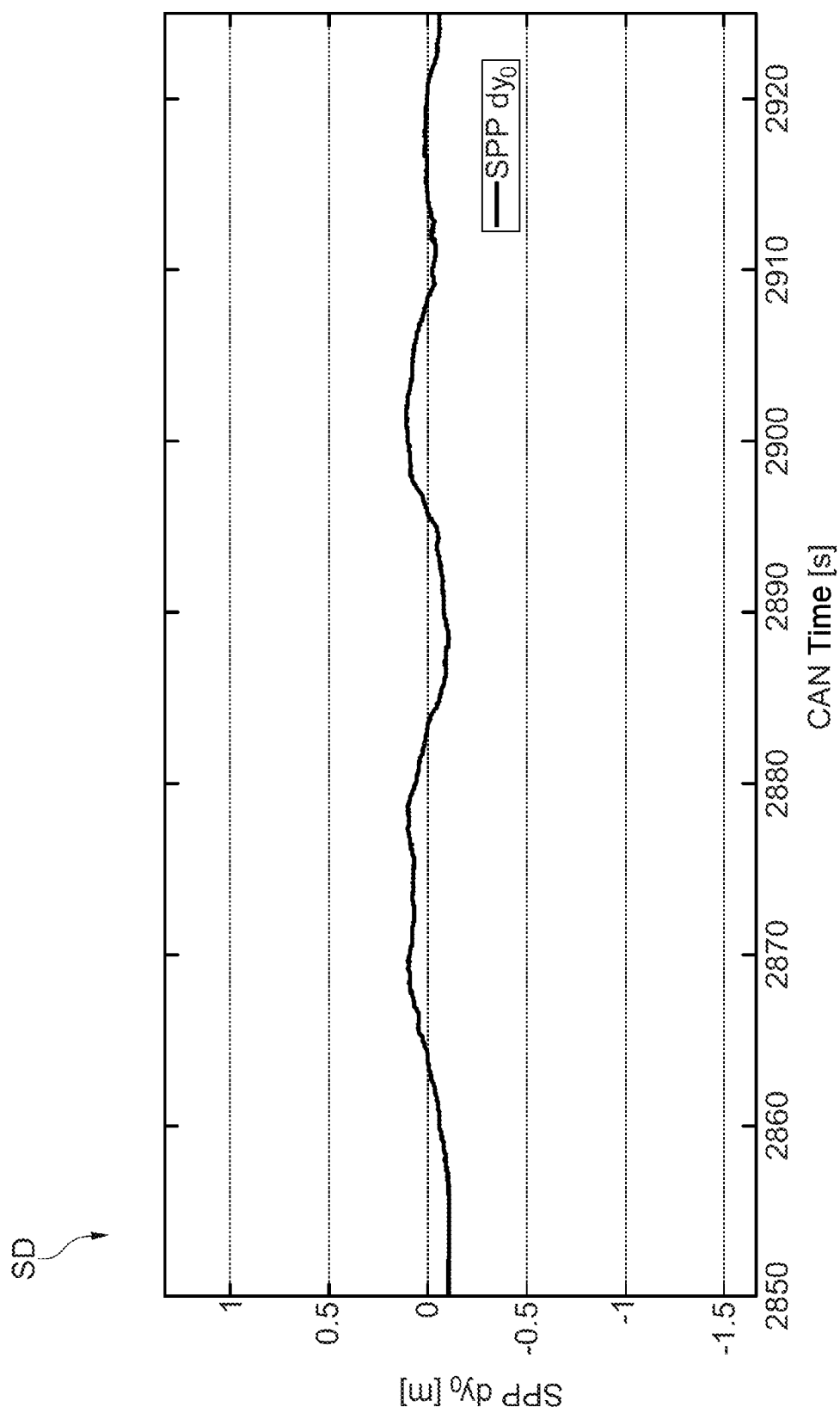
FIG. 4 shows a schematic representation of a signal characteristic without signal jumps.

Reference is now additionally made to FIGS. 2 to 4.

During operation, the jump detection unit 8 inputs the sensor data SD in a first step S100.

In a further step S200, the jump detection unit 8 evaluates the sensor data SD in order to establish whether the sensor data SD have signal jumps I (see FIG. 3) or the sensor data SD are free from signal jumps I (see FIG. 4).

In other words, the jump detection unit 8 determines whether abrupt signal level changes are present in the sensor data. In order to detect the signal jumps I, a predefined criterion is used that defines when an abrupt signal level change is present. The abrupt signal level change may be the case if a value change exceeds a predefined percentage value change within a predefined time interval. Alternatively, a Fourier transformation can also be performed. If a frequency spectrum has high-frequency components, a signal jump I is inferred. In the signal data SD shown in FIG. 3, three signal jumps I are present within the time interval.

In a further step S300, the value determination unit 10 defines the value W by evaluating the signal jumps I. It can be provided for example, that a counter is incremented by one for each detected signal jump I within a predefined time interval. Due to a high number of signal jumps I, a high value W thus represents a rough signal or stands for a high signal roughness of the sensor data SD, whereas, due to a lower number of signal jumps I, a low value W indicates a steady signal with a low signal roughness of the sensor data SD. Stated differently, if a number of signal jumps I is greater than the predefined percentage value change, the value W of the sensor data SD indicates signal roughness and, if a number of signal jumps I is less than the predefined percentage value change, the value W sensor data SD does not indicate signal roughness. In the case shown in FIG. 3, the value W is three, whereas, in the case shown in FIG. 4, the value W is equal to zero.

It can furthermore additionally be provided that, along with a number of signal jumps I, a height of the signal jumps I can also be detected and evaluated. The height of a signal jump I is understood to mean a deviation from an average signal level value within a predefined time interval. A combined criterion in which e.g. each signal jump I is weighted with its height, e.g. through multiplication by a quantity representing its height, is thus used to define the value W. In other words, an area of the signal jumps I or an integral over the signal jumps I is taken into account.

In a further step S400, the comparison unit 12 compares the value W with a threshold value SW. If the value W is greater than the threshold value SW, an output signal AS is generated. In the present example embodiment, a value of 1 or 2 has been selected for the threshold value SW. The value W is thus greater than the threshold value SW for the case shown in FIG. 3, whereas the threshold value SW is less than the value W in the case shown in FIG. 4.

In the case shown in FIG. 3, the output signal AS is transferred to the signal generation unit 6 that, on receiving the output signal AS, generates and outputs a suppression signal US in a further step S500 in order to deactivate the congestion assistant 2.

The suppression signal US causes suppression of an activation of the congestion assistant 2, which is set to standby, even if prerequisites for takeover of motor vehicle control by the congestion assistant 2 are met.

An activation of the congestion assistant 2 in the presence of unreliable sensor data SD is thus avoided and the overall reliability of the congestion assistant 2 is increased.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to operate a motor vehicle comprising:
   evaluating sensor data input to a congestion assistant to define a value indicative of a signal roughness of the sensor data, the signal roughness value being defined by incrementing a counter for each detected signal jump of a plurality of signal jumps from one signal of the sensor data and within a time interval; and
   generating a suppression signal that prevents automatic activation of the congestion assistant responsive to the signal roughness value being greater than a threshold value level of signal roughness.

2. The method as claimed in claim 1, wherein the sensor data are indicative of a deviation of a motor vehicle center from a center line of a road.

3. The method as claimed in claim 1, wherein the sensor data are indicative of an alignment of the motor vehicle with a center line of a road.

4. The method as claimed in claim 1, wherein the sensor data are indicative of a curve of a road.

5. The method as claimed in claim 1, wherein the sensor data are indicative of a reliability, defined by the signal roughness, of a side line and center line detection.

6. The method as claimed in claim 1, wherein the signal roughness value is further defined using a weighted value for each signal jump, each signal jump weighted using an associated height of the signal jump.

7. The method as claimed in claim 1, wherein the signal roughness value is further defined using a weighted value for each signal jump, each signal jump weighted using an associated area of the signal jump.

8. A vehicle congestion assistant comprising:
   an evaluation unit configured to, in response to input sensor data, define a value indicative of a signal roughness of the sensor data, the signal roughness value being defined by performing a Fourier transformation on one signal from the sensor data to infer one or more signal jumps over a time interval; and
   a signal generation unit configured to, in response to the signal roughness value being greater than a threshold value, generate a suppression signal to prevent an automatic congestion assistant activation.

9. The vehicle congestion assistant as claimed in claim 8, wherein the sensor data are indicative of a deviation of a vehicle center from a road center line.

10. The vehicle congestion assistant as claimed in claim 8, wherein the sensor data are indicative of an alignment of a vehicle with a center line of a road.

11. The vehicle congestion assistant as claimed in claim 8, wherein the sensor data are indicative of a curve of a road.

12. The vehicle congestion assistant as claimed in claim 8, wherein the sensor data are data indicative of a reliability, defined by the signal roughness, of a side line and center line detection.

13. A vehicle comprising:
   a congestion assistant configured (i) determine a value indicative of a signal roughness via an evaluation unit by defining signal jumps in input sensor data, and incrementing a counter for each detected signal jump of a plurality of signal jumps from one signal of the sensor data within a time interval, and (ii) in response to the signal roughness value being greater than a predefined threshold value, generate a suppression signal, via a signal generation unit, that prevents an automatic activation of the congestion assistant.

14. The vehicle as claimed in claim 13, wherein the sensor data are indicative of a deviation of a vehicle center from a road center line.

15. The vehicle as claimed in claim 13, wherein the sensor data are indicative of an alignment of the vehicle with a center line of a road.

16. The vehicle as claimed in claim 13, wherein the sensor data are indicative of a curve of a road.

17. The vehicle as claimed in claim 13, wherein the sensor data are data indicative of a reliability, defined by the signal roughness, of a side line and center line detection.

18. The vehicle as claimed in claim 13 wherein the signal roughness value is further defined using a weighted value for each signal jump, each signal jump weighted using an associated height of the signal jump.

19. The vehicle as claimed in claim 13, wherein the signal roughness value is further defined using a weighted value for each signal jump, each signal jump weighted using an associated area of the signal jump.

* * * * *